May 8, 1962     J. W. SCOTT     3,033,845
PROCESS OF CHLORINATING POLYETHYLENE
Filed April 7, 1960
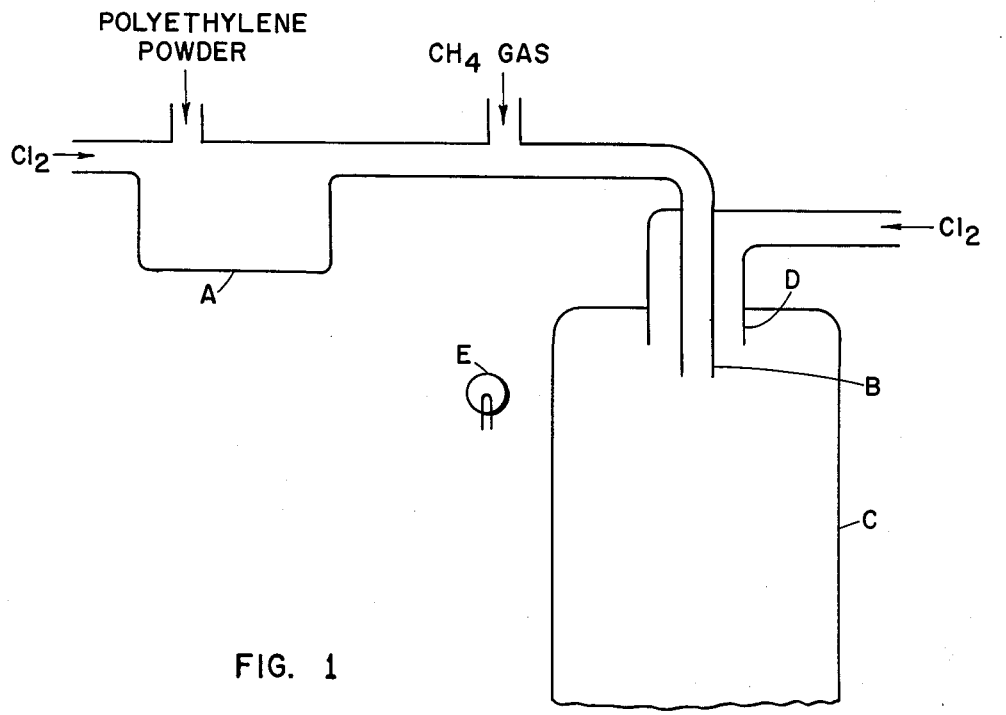
FIG. 1
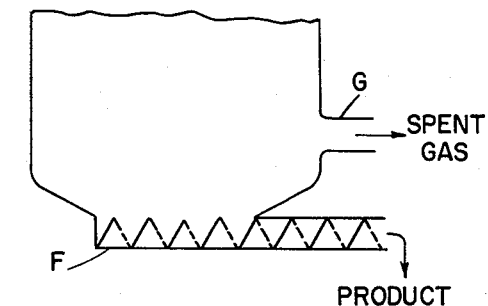
JOHN WALTER SCOTT
INVENTOR
BY *Walter H. Steinbauer Jr.*
ATTORNEY

3,033,845
PROCESS OF CHLORINATING POLYETHYLENE

John Walter Scott, Beaumont, Tex., assignor to E. I. du Pont de Nemours and Company, Wilmington, Del., a corporation of Delaware
Filed Apr. 7, 1960, Ser. No. 20,752
2 Claims. (Cl. 260—94.9)

This invention is directed to chlorinated polyethylene and more particularly to a new method for making a chlorinated polyethylene without the use of a solvent.

Valuable products are obtained by chlorinating polyethylene. The usual chlorination processes are carried out in special solvents, such as carbon tetrachloride, which must have high solvent power for the polyethylene and must be inactive to chlorine. Such solvents are relatively expensive and must be recovered after the step in which the chlorinated polyethylene is isolated. Carbon tetrachloride is toxic and requires unusual precautions in plant operation and must also be completely eliminated from the final products. The disadvantages of chlorinated solvents are increased in the case of the new, more highly linear polyethylenes, which in general require much larger volumes of solvent.

It has been proposed in British Patent 799,952 to chlorinate solid, finely divided polyethylene directly in the vapor phase and without the use of solvent by suspending it in a stream of chlorine at temperatures below 100° C. Chlorination takes place under these conditions but the product is extremely heterogeneous, and, accordingly very different from the product with the same overall chlorine content made in solution, since the outer portion of the polyethylene particles are highly chlorinated and the interior hardly affected.

It is an object of the present invention to provide a novel process for preparing chlorinated polyethylene. It is a further object of this invention to provide a process for preparing chlorinated polyethylene, which process does not utilize a solvent. A still further object is to provide substantially uniformly chlorinated polyethylene by utilizing a normally gaseous hydrocarbon as hereinafter described. These and other objects will become apparent in the following description and claims.

More specifically, the present invention is directed to a process of chlorinating polyethylene to give a homogeneous product, by suspending said polyethylene in finely divided form in a stream of chlorine and then introducing and causing to react with said chlorine, a normally gaseous hydrocarbon or hydrogen in an amount sufficient to raise the temperature to 150 to 250° C., there being enough chlorine remaining to chlorinate the polyethylene to the desired extent.

The products formed by the present novel process are significantly rubbery, and distinctly differ from the brittle products formed by the vapor phase chlorination of solid polyethylene to the same extent at lower temperatures.

Equipment for carrying out this process is illustrated in the figure of the accompanying drawing. The powdered polyethylene is suspended in the chlorine in an agitated feeder A, and from this a constant stream of chlorine, containing the required amount of suspended polyethylene powder, is mixed with methane and then passed through a burner tip B into a vertical glass cylinder C. The burner tip is surrounded by an annular inlet D through which additional chlorine may be introduced. A light source E is placed outside C and opposite B to start the reaction between chlorine and methane. The bottom of cylinder C is provided with a screw conveyor F for removing the solid product and an outlet G for the spent gas.

The reaction temperature, which should ordinarily be between 150 and 250° C. is regulated by varying the proportion of hydrocarbon feed. The degree of chlorination of the polyethylene is regulated by varying the excess of chlorine remaining after the reaction with the methane has taken place. The product may contain up to 60% chlorine or more, 15 to 45% being preferred. The polyethylene may be of the branched type with a density about 0.920 or of the substantially completely linear type with density 0.960 or higher, or intermediate types. The particle size should preferably be less than 0.006 inch, that is, 100 mesh or smaller.

Hydrogen may be used instead of methane to generate heat by reaction with part of the chlorine. Ethane, propane, etc. may also be used but are less convenient because of the more complex chlorination products formed. The chlorine may be diluted with an inert gas such as nitrogen, to moderate its reaction with the polyethylene, if necessary.

A representative example illustrating the present invention follows.

Chlorine, at a rate of 400 g. per hour containing 200 g. of suspended, finely divided polyethylene of melt index 0.7 and density 0.948, is mixed with 9 g. of natural gas containing 92.4% methane, 4.3% ethane, and smaller percentages of higher homologs. The reaction of the chlorine and methane and chlorination of the polyethylene gave a temperature of 180° C. The rubbery product collected contained 33.2% chlorine.

It is to be understood that hydrogen, ethane and propane may be utilized in the process of the present invention to achieve substantially the same results as achieved with the methane gas of the preceding example; mixtures of these gases are also within the scope of this invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The process of chlorinating polyethylene to give a homogeneous product wherein said polyethylene is suspended in finely divided form in a stream of chlorine, followed by introducing and reacting, with the chlorine component of said polyethylene-chlorine system, a reactant taken from the group consisting of hydrogen and a saturated, aliphatic normally gaseous hydrocarbon, said reactant being present in an amount sufficient to raise the temperature of the reaction system to a temperature within the range of 150–250° C., and, sufficient chlorine being present after reaction with said reactant to chlorinate said polyethylene, followed by chlorinating said polyethylene until a chlorinated polyethylene containing from 15% to 60% chlorine is produced.

2. The process of claim 1 wherein a chlorinated polyethylene containing from 15% to 45% chlorine is produced.

References Cited in the file of this patent
UNITED STATES PATENTS
2,928,819    Noeske _____ Mar. 15, 1960